United States Patent [19]

Garrett

[11] 4,324,657

[45] Apr. 13, 1982

[54] APPARATUS FOR THE TREATMENT OF LIQUIDS

[76] Inventor: Michael E. Garrett, 92 York Rd., Woking, Surrey, England

[21] Appl. No.: 874,700

[22] Filed: Feb. 2, 1978

[30] Foreign Application Priority Data

| Feb. 4, 1977 | [GB] | United Kingdom | 4699/77 |
| Feb. 16, 1977 | [GB] | United Kingdom | 6490/77 |
| Mar. 17, 1977 | [GB] | United Kingdom | 11365/77 |
| Sep. 12, 1977 | [GB] | United Kingdom | 37978/77 |

[51] Int. Cl.$^3$ ............................................. C02F 3/22
[52] U.S. Cl. .................................... 210/197; 210/207; 210/220
[58] Field of Search ......................... 210/3-7, 210/14, 15, 194, 195 S, 195 SO, 197 S, 218-220, 205, 221 P, 221 R, 207, 208; 261/29, 36 R, 93, DIG. 75

[56] References Cited

U.S. PATENT DOCUMENTS

| 3,547,814 | 12/1970 | McWhirter | 210/14 |
| 3,788,476 | 1/1974 | Othmer | 210/208 |
| 3,804,255 | 4/1974 | Speece | 210/221 P |
| 3,966,598 | 6/1976 | Ettelt | 210/221 P |
| 3,983,031 | 9/1976 | Kirk | 210/15 |
| 4,000,227 | 12/1976 | Garrett | 261/DIG. 75 |
| 4,043,771 | 8/1977 | Anand | 210/15 |
| 4,071,443 | 1/1978 | Gorski et al. | 210/7 |

Primary Examiner—Benoit Castel
Attorney, Agent, or Firm—Dennison, Meserole, Pollack & Scheiner

[57] ABSTRACT

The invention relates to apparatus for the treatment of sewage or other aqueous waste material having a biochemical oxygen demand in a single tank, the treatment involving the oxygenation of the sewage.

With reference to FIG. 1, a volume of sewage in a treatment tank 110 establishes itself naturally into an upper layer 124 of clear liquid and a lower layer of liquid containing bacterial sludge. Liquid containing bacterial sludge from the lower layer 122 is united with incoming sewage from pipeline 120 and the resulting mixture is pumped by pump 114 into an oxygenating chamber 115 in which oxygen is dissolved in the liquid. The resulting oxygenated liquid enters a stilling chamber 112 located in the upper layer 124. Clear liquid is run off from the tank 110 over a weir 128.

2 Claims, 6 Drawing Figures

APPARATUS FOR THE TREATMENT OF LIQUIDS

This invention relates to apparatus for treating liquid by dissolving gas in a liquid, and particularly to dissolving an oxygen rich gas in an aqueous material, for example waste water having a biochemical oxygen demand.

Many known sewage treatment processes employ several treatment stages including an aeration stage, a primary and sometimes one or more secondary treatment stages in which biological breakdown of the sewage takes place, and a settlement stage in which the treated sewage is separated into clarified liquor and a concentrated sludge. Each stage is often carried out in one or more separate treatment tanks in each of which there is a considerable residence time. Moreover, settlement to separate bacterial sludge and treated liquor can result in considerable periods of anaerobicity in which little treatment takes place resulting in a relatively lengthy overall treatment cycle.

In some relatively recent proposals the use of oxygen instead of air for oxygenation in the secondary treatment stage or stages of a sewage treatment plant has been recommended. This can bring certain advantages in speeding up total treatment cycle and in increasing the biochemical load that the treatment plant can cope with. On the other hand substituting oxygen for air can lead to an undesirable increase in the acidity of the waste water being treated owing to an increased rate of bacterial formation of carbon dioxide resulting from the increase in the concentration of dissolved oxygen that can be obtained. In addition, some previous proposals for using oxygen have resulted in an excessive rate of slude formation. Moreover, in some oxygen using plants closed rather than open-topped treatment tanks are required, this adding to the capital cost of the plant.

It is an object of the invention to provide apparatus for treating aqueous waste material having a biochemical oxygen demand which requires only a single treatment tank, which can be operated with a supply of pure oxygen, commercial oxygen, oxygen-enriched air or other oxygen containing gas to support respiration of bacteria that take part in the process, and which are capable of being operated without the aforementioned disadvantages.

Other objects of the invention are disclosed in the ensuing description.

The invention provides apparatus for treating an aqueous waste material having a biochemical oxygen demand, which comprises structure for passing a continuously advancing stream of the waste material through a passage and introducing the stream into a treatment vessel containing a volume of the material, combining the stream with a continuously advancing stream of aqueous liquor containing bacterial sludge, introducing oxygen or oxygen-containing gaseous mixture into the combined streams so as to form discrete bubbles of oxygen gas therein and hereby facilitate dissolution of the oxygen, the streams being introduced into a stilling zone confined within a relatively calm upper layer of clarified aqueous waste material in the vessel such that the momentum of the liquid so introduced is substantially reduced before the liquid passes to a lower zone of the vessel in which biological treatment of the aqueous material takes place and which contains the bacterial sludge, withdrawing clarified liquor from said layer and recycling aqueous material containing bacterial sludge from the liquor in the lower zone and forming from it the aforesaid continuously advancing stream of aqueous liquor containing bacterial sludge.

The invention thus provides apparatus for treating aqueous waste material having a biochemical oxygen demand, comprising a vessel for containing a volume of the material; means for continuously advancing a stream of the aqueous waste material through a passage in communication with a confined stilling zone of the vessel spaced above the bottom of the vessel; means for combining with the said stream a stream of aqueous liquor containing bacterial sludge; means defining said stilling zone and keeping liquor within it separate from an upper layer of clarified liquor which, in operation of the apparatus, surrounds the stilling zone such that, in operation of the apparatus, the momentum of the liquid is substantially reduced before the liquid passes to a lower zone of the vessel in which, in operation of the apparatus, biological treatment of the aqueous material takes place and which contains the bacterial sludge; means for introducing oxygen or oxygen-containing gas mixture into the combined streams so as to form discrete bubbles of oxygen gas therein and thereby facilitate dissolution of the oxygen; and means for recycling aqueous material containing bacterial sludge comprising means for withdrawing aqueous waste material containing bacterial sludge from the liquor in the lower zone and for forming the aforesaid continuously advancing stream of aqueous liquor containing bacterial sludge.

Apparatus according to the invention has the potential advantage that waste material can be treated in a single main vessel, clarified liquor can be run off from the upper zone of the vessel and liquor containing suspended solids (ie. bacterial sludge) can be continuously recycled for re-oxygenation.

Oxygenation of the stream by the introduction of gas bubbles therein obviates the need for a separate aeration tank used in prior art systems, and, moreover, secondary treatment of settled sludge in a further separate process stage is also rendered unnecessary. It is also believed that a process according to the invention has the advantage of achieving a relatively calm treatment zone fed with oxygenated liquor, in a system where the total treatment cycle takes place in a single treatment vessel. Furthermore, since oxygenation and settlement take place in a single vessel, anaerobic conditions are not induced by settlement and the risk of floating sludge solids resulting from denitrification is minimised.

The stream of aqueous material containing bubbles (of oxygen) is preferably passed downwardly through an expansion chamber in which the velocity of the liquid stream is reduced to a value which allows a prolonged contact time between the downflowing liquid and bubbles of gas rising in the chamber, the stream being introduced into the chamber so as to create sufficient turbulence within the chamber to shatter or break up the larger coalesced bubbles in the stream into relatively smaller bubbles. The stream containing liquid, dissolved gas and possibly relatively small bubbles of undissolved gas may then be passed into the treatment vessel. In the expansion chamber the velocity of the liquid is preferably such that only the very smallest bubbles are carried out of the bottom of the chamber. Larger bubbles some of which may be formed by smaller bubbles which have coalesced in the chamber, rise in the chamber to the turbulent region which results in these larger bubbles being shattered.

In some embodiments further turbulence may be created by the impingement of the liquid stream entering the chamber on the surface of the liquid in the chamber.

Typically, the liquid flowing downwards through the expansion chamber does not have a uniform velocity. Liquid adjacent the walls of the chamber tends to flow more slowly than liquid in the centre of the chamber. The liquid velocity distribution resulting from a nozzle or pipe discharging into the upper chamber is typically such that although the average downward velocity may be in the order of, say, one foot per second (0.3 m per second), an axially central portion of the liquid may have a downward velocity of 2 to 6 ft/sec (0.5 to 2 m/sec), for example, 4 to 6 feet per second (1 to 2 m/sec) depending on the discharge coefficient and the outer region of the chamber may even contain upwardly flowing liquid with gas bubbles entrained therein. Such upwardly flowing liquid will be drawn into the higher velocity, central, downwardly flowing portion of liquid. Typically, the average downward velocity of the liquid stream entering the liquid chamber is selected for there to be a sufficient velocity to carry bubbles downwards and sufficient turbulence to shatter many of the larger bubbles. It is undesirable to increase the velocity to a value such that none of the bubbles can rise since gas/liquid contact would then be reduced.

In some embodiments of the invention, the expansion chamber comprises a hollow cylindrical member having a constant cross-sectional area. A further chamber or larger cross-sectional area may be provided immediately below the expansion chamber to act as a disengagement zone in which a relatively calm, body of liquid exists below the relatively turbulent gas/liquid contact zone in the expansion chamber. In the disengagement zone relatively small bubbles are collected and coalesce into larger bubbles which rise by bouyancy into the turbulent zone where shear forces reduce some of them once again to smaller bubbles. Typically, the downward velocity in the disengagement zone is 3-6 ft/minute.

It is preferred that the gas is introduced into the stream at a location adjacent a pump provided in the line upstream of the expansion chamber to provide a pressurised liquid flow through the line. Although the gas may be introduced directly into the volute of the pump. In this way, the gas is introduced into a very turbulent zone of the liquid stream so that relatively small bubbles of gas are immediately present in the liquid stream.

In some embodiment of the invention the bottom of the vessel may slope downwards so that sludge tends to move under gravity towards an outlet through which it is recycled as aforesaid, but in other embodiments a flat bottom may be used, though in such other embodiments scrapers and/or other means for periodically removing any unoxygenated sludge are preferably employed.

If desired, the expansion chamber may be located in the stilling box (ie. chamber) itself. Thus, there may be provided a settling tank; a stilling box in the settling tank; a partition or other member across the stilling box dividing it into separate upper and lower regions; a conduit for feeding aqueous material into the upper region of the stilling box; a passage through the partition (or other member), the passage being wider at its outlet than its inlet and thereby constituting an expansion chamber; a mechanical agitator or other mechanical means for creating a flow, initially turbulent, of aqueous material from the upper region of the stilling box through the passage and into the lower region of the stilling box; means for introducing oxygen, or oxygen-containing gas mixture, into the turbulent flow, and means for passing to the upper region of the stilling box bacterial sludge settling out of the aqueous waste material towards the bottom of the tank.

Apparatus according to the invention may be utilized in carrying forth a process, including the steps of introducing the stream of aqueous material into a stilling box divided by a partition or other member into an upper and lower region, operating a mechanical agitator or other mechanical means so as to create a flow, initially turbulent, of aqueous material from the upper region of the stilling box through a passage in the partition (or other member) and then through the lower region of the stilling box, the passage being wider at its outlet that its inlet such that the aqueous material loses velocity in the passage and thereby constituting the expansion chamber; introducing the oxygen, or oxygen-containing gas mixture into the turbulent flow whereby the turbulence causes the formation of bubbles of gas which pass through the passage in the partition (or other member) in suspension in the aqueous material flowing therethrough, and passing the bacterial sludge to the upper region of the stilling box.

In operation, bubbles of oxygen are decelerated with the aqueous material as it passes through the passage, and as it subsequently passes through the lower region of the stilling box. The flow of liquid through the passage can be arranged so that larger bubbles tend to rise against the flow of aqueous waste material through the lower region of the stilling box. Indeed, it is possible to arrange the apparatus so that only relatively small bubbles of oxygen will be carried out of the stilling box with the aqueous material. Such bubbles will be rapidly dissolved in the aqueous wastes material owing to the small size. The larger bubbles are retained for the longer time in the lower region of the stilling box thus making it possible for these bubbles to be dissolved as well.

There may be a tendency for a relatively large pocket of gas to collect immediately underneath the partition or other member. Preferably, therefore, in addition to having an inlet for the oxygen or oxygen-containing gas mixture, the passage has in communication with the lower region of the stilling box outside the passage an additional inlet or inlets for undissolved bubbles of oxygen, this inlet or these inlets preferably being positioned such that the oxygen bubbles are reintroduced into the turbulent flow.

The mechanical agitator is preferably an impeller. The mechanical agitator may be used to create a suction effective to draw bacterial sludge from towards the bottom of the tank via a first conduit to the upper region of the stilling box.

The conduit may therefore be provided extending through the partition and having one of its ends disposed towards the bottom of the tank and its other end in the upper region of the stilling box. If desired, however, a separate pump may be used to provide the desired flow of solids into the tank.

The incoming aqueous material is preferably introduced via a second conduit into the bacterial sludge being returned to the upper region of the stilling box. Alternatively, the aqueous waste material may be introduced into the upper region of the stilling box separately from the solids.

The partition is preferably a lamina. It preferably has an aperture and, mounted thereabove and therebelow, respectively narrower and wider open ended members which co-operate to define passage. The impeller is preferably situated in the narrower open-ended member. Aqueous waste material passing from the upper to the lower region of the stilling box thereby undergoes a first decrease in the velocity when it passes from the narrower to the wider part of the passage and a further decrease in velocity as it passes out of the passage into the lower region of the stilling box.

Preferably, means are provided to skim contaminants from the surface of the clarified liquor.

Preferably, the aqueous material is effectively recycled a number of times. In other words, the rate of recycling aqueous material to the treatment vessel is preferably a number of times greater than the rate at which aqueous waste material is received by the treatment vessel for treatment. This will generally be sufficient for adequate removal or organic pollutant to occur. The number of times is typically the range 5 to 20, though it may be greater, for example up to 100, depending on the biochemical oxygen demand of the incoming sewage (or other aqueous waste material). For example, if the oxygenation device is able to dissolve 30 mg/l of oxygen, the rate of recycling aqueous material containing bacterial sludge to the rate of introducing new aqueous waste material will need to be 8 to 1 to remove 270 mg/l of biochemical oxygen demand. The incoming aqueous waste material contains naturally the bacteria necessary for the biological (or biochemical) treatment. In the treatment vessel there occurs naturally a net upward movement of liquid. The aqueous material establishes itself naturally into a lower zone of aqueous liquor containing bacterial sludge and a upper layer of clarified aqueous liquor. Clarified liquor flows from the surface of the upper layer out of the vessel, typically over an outlet weir provided in the vessel. Thus, there is a continuous flow of clarified, treated liquor out of the treatment vessel.

It is desirable to obtain relatively high concentrations of dissolved oxygen in the aqueous material passing through the stilling zone so as to promote rapid oxidation of the organic pollutants. In practice, it is possible to attain dissolved oxygen concentrations of up to 25 parts per million or more (for example 30 parts per million) in the liquor passing through the stilling zone, depending on, inter alia, the relative rates at which liquid containing bacterial sludge is recycled and new aqueous material for treatment is received. Having a rate of recycle greater than the rate at which new aqueous material enters for treatment makes possible favourable conditions for oxygenation. Using an expansion chamber and a disengagement chamber, as aforementioned, it is possible to conduct the oxygenation such there is substantially no contact between the atmosphere and the liquid being oxygenated. Thus, nitrogen dissolved in the incoming aqueous waste material is substantially the only nitrogen that enters the liquid being treated. Thus, the greater the ratio of the rate of recycle to the rate at which new material flows into the process, the lower the concentration of dissolved nitrogen will be in the liquid being oxygenated and hence the greater will be the concentration of permanently dissolved oxygen (as distinct from dissolved oxygen which almost instantaneously comes out of solution) that can be attained.

The bacteria require oxygen for respiration. They give off carbon dioxide which is dissolved in the liquid. Dissolving oxygen or oxygen-containing gas mixture in the liquid being recycled displaces at least some of the dissolved carbon dioxide. It is found that the gas immediately above the liquid entering the stilling chamber is rich in carbon dioxide, indicating that carbon dioxide has been displaced by oxygen that has been dissolved in the liquid passing through the oxygenating device. Thus, we have found that excessively acid conditions in the treatment vessel are avoided. Typically, the pH of the liquid in the treatment vessel may be in the order of 6.5. Having a relatively large ratio rate of recycle to rate of inflow of new aqueous waste material for treatment facilitates the attainment of such relatively high pH levels without the need to have recourse to separate means for stripping carbon dioxide from the liquid.

Typically, the concentration of dissolved oxygen in the lower zone may be in the order of 3 ppm at the bottom and about 0.5 ppm at the top of this zone. The liquid being oxygenated may typically contain 2000 to 5000 mg per liter of suspended solids. The ratio by weight of food (for the bacteria) to the biomass (ie weight of the bacteria in this liquid) may typically be in the order of 0.5 to 3. We believe that such a total regime favours relatively low growth in the bacteria population in the treatment vessel, thus making it possible to keep down the amount of surplus sludge which from time to time may need to be discharged.

The aqueous waste material may be domestic or municipal sewage, industrial sewage or other industrial effluent such as that from a plant for pulping paper.

The apparatus according to the invention will now be described by way of example and with reference to the accompanying drawings of which:

Figure 1:
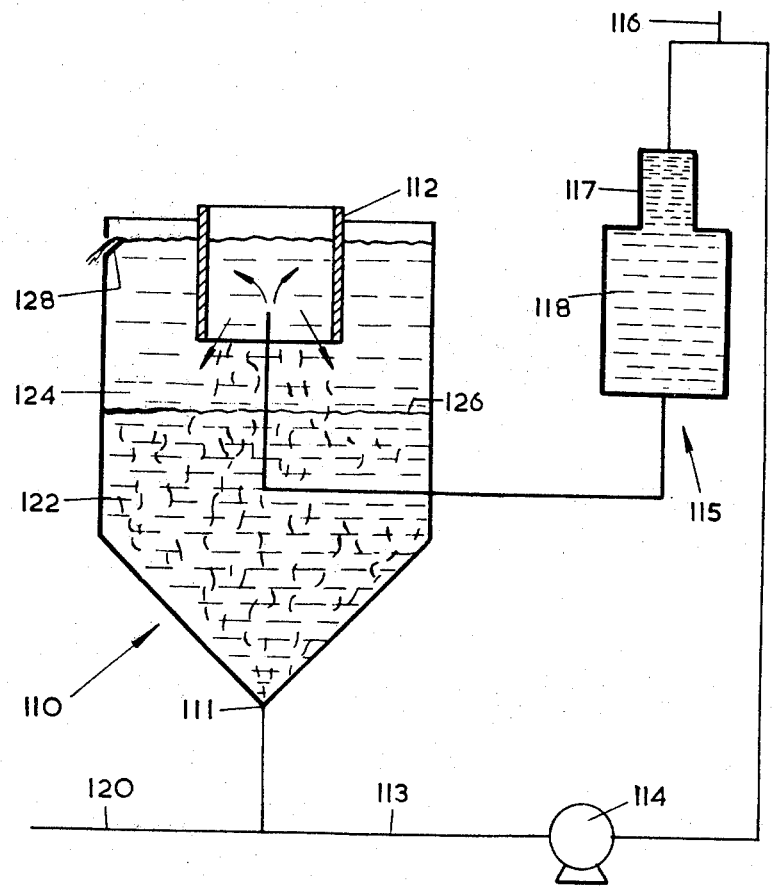
FIG. 1 is a diagrammatic representation of a sewage treatment apparatus embodying the invention.

Referring to FIG. 1 of the drawings a sewage treatment apparatus comprises a treatment tank 110 having a sloped bottom leading to an outlet 111. An open-ended tubular stilling box (or chamber) 112 is suspended in an upper zone 124 of the tank 110. A recirculation liquid pipe line 113 leads from outlet 111 and pump 114 in the line 113 withdraws a flocculent slurry containing bacterial sludge which settles towards the bottom of the tank 110 and circulates it at a pressure in the range 3 to 20 ft water gauge through a gas/liquid contacting device 115 from which it passes into the sewage in the tank 110 at a position within the stilling box 112. Oxygen or oxygen rich gas, usually containing at least 30% and preferably at least 90% by volume of oxygen, is passed into the liquid flowing through 113 through oxygen supply pipeline 116. Additional feed for the bacteria in the form of liquid influent, is passed into the liquid line 113 through conduit 120 which is connected to a supply of such feed.

The oxygen supply line 116 may lead from a pressurised source or the oxygen may simply be drawn in by a vacuum action provided by inserting a venturi in the line 113 at the point where the line 116 joins line 113. This location may be adjacent pump 114 so that the great turbulence created in the stream of liquid causes relatively small gas bubbles to be formed in the stream. It is also possible to inject the oxygen-rich gas directly into the pump volute.

This gas is introduced at a rate to provide a quantity of dissolved in the liquid stream of 25 ppm or more.

The contactor device 115 comprises an upper chamber 117 and a lower larger chamber 118. These may be of circular, rectangular, square or polygonal cross-sectional shape. The velocity of liquid in the upper chamber 117 is determined by the flow of the incoming stream and the cross-sectional area of the chamber. However, as aforementioned, within the chamber 117 a central portion of liquid will have a greater downward velocity than the liquid adjacent the walls of the chamber, which latter liquid may even have a small positive upward velocity. Thus, although an average velocity through the chamber 117 of 1 ft/second (0.3 m/second) may be selected, this will typically give a central downwardly moving stream of liquid having a velocity of 4 to 6 feet (approximately 1 to 2 m) per second (for example 5 feet (1.5 m) per second). This relatively fast downwardly moving central stream of liquid carries entrained bubbles of gas into the lower chamber 118. The velocity of the liquid through the chamber 118 is typically in the order of 6 feet (1.9 m) per minute. The reduction of velocity occurring between the chambers may be arranged to cause all but the smallest bubbles to be retained in the chamber 118. Bubbles coalesce in the chamber 118 to form larger bubbles which rise against the downward flow of liquid and enter the upper chamber 117. Some of the bubbles will continue to rise, posssibly with the liquid adjacent the walls of the chamber 117, and re-enter the turbulent zone induced by the liquid entering the chamber 117. This turbulence creates shearing forces which break-up the bubbles into smaller ones which are carried down with the liquid descending the chamber 117.

Typically, the passage of liquid through the contactor device 115 takes about 1 minute.

A liquid stream containing dissolved oxygen, about 25 ppm, and small bubbles of undissolved gas passes into the tank 110.

The oxygenated liquid stream enters the volume of sewage in tank 110 within the stilling box 112 and its momentum is substantially destroyed in the volume of liquid contained in such box. A relatively calm flow of oxygenated bacterial sludge, slightly denser than the clear liquor flows downwards out of the confines of box 112 into a lower treatment region 122 of the tank 110 without causing any substantial agitation of this region. The bacteria contained in the sludge in region 122 utilises the oxygen to metabolise soluble organic materials contained in the liquid. Some treated liquor rises through the sludge into the zone 124, when further separation from bacteria and contained solids occurs. The zone 124 contains clear liquid. The boundary 126 between the zone 124 and the region 122 is relatively pronounced.

As the oxygenated liquid enters the stilling box 112 carbon-dioxide rich gas tends to be released therefrom in the form of bubbles which rise to the surface of the liquid in the tank 110.

Clarified liquid is run off from the region of the tank encircling the stilling box 112 over an outlet weir 128. Settled sludge at the bottom of the tank is recycled through the liquid line 113, for further oxygenation, the number of times of effective recycle being sufficient for adequate removal of organic polutants to occur. Thus the rate of withdrawal of material through the outlet 111 may be five or more times greater than the rate of inflow through the line 120.

From time to time excess sludge may be discharged from the tank 110 through the outlet 111.

Material such as grease and lanolin may rise to the surface of the clarified liquor in the zone 124.

Figure 2:
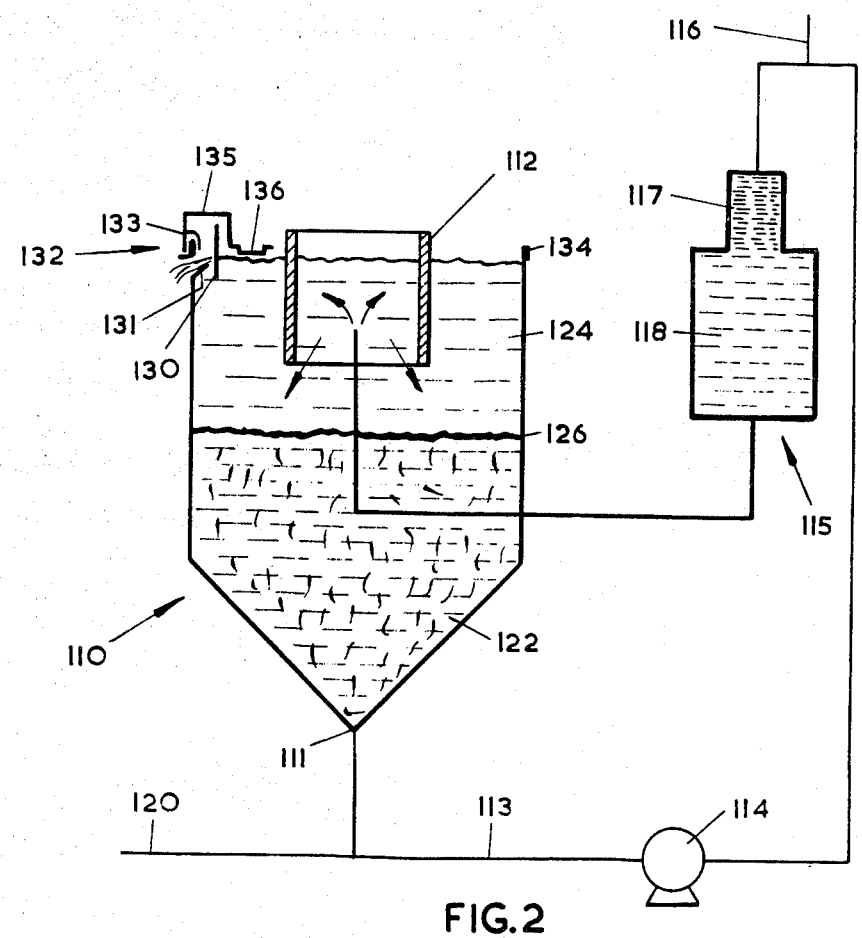
FIG. 2 is a diagrammatic representation of another sewage treatment apparatus according to the invention.

It is therefor desirable to skim, possibly intermittently, such materials from the surface of the clarified liquor. An arrangement for doing this is shown in FIG. 2. A baffle 130, in the form of a vertical plate, is provided to stop contaminating material in the surface of the clarified liquor from running over the discharge 131.

Such skimming may be carried out continuously or intermittently as required. The device 132 comprises a generally U-shaped portion 133 which embraces the upper rim of the tank 110. The outer limit of portion 133 carries a pinion which meshes with teeth provided on the underside of a peripheral track 134 provided on the outer surface of the aforesaid upper rim. The device 132 has a rod-like section 135 extending from portion 133, which section extends upwards, turns inwardly of the tank 110 over baffle plate 130 and then downwards to terminate in a channel-shape section 136 which dips beneath the surface of the liquor in the tank 110.

As the device 132 moves around the track 134, the section 136 carries the concentrated contaminants to collection and discharge troughs, provided at the upper end of the tank.

Figure 3:
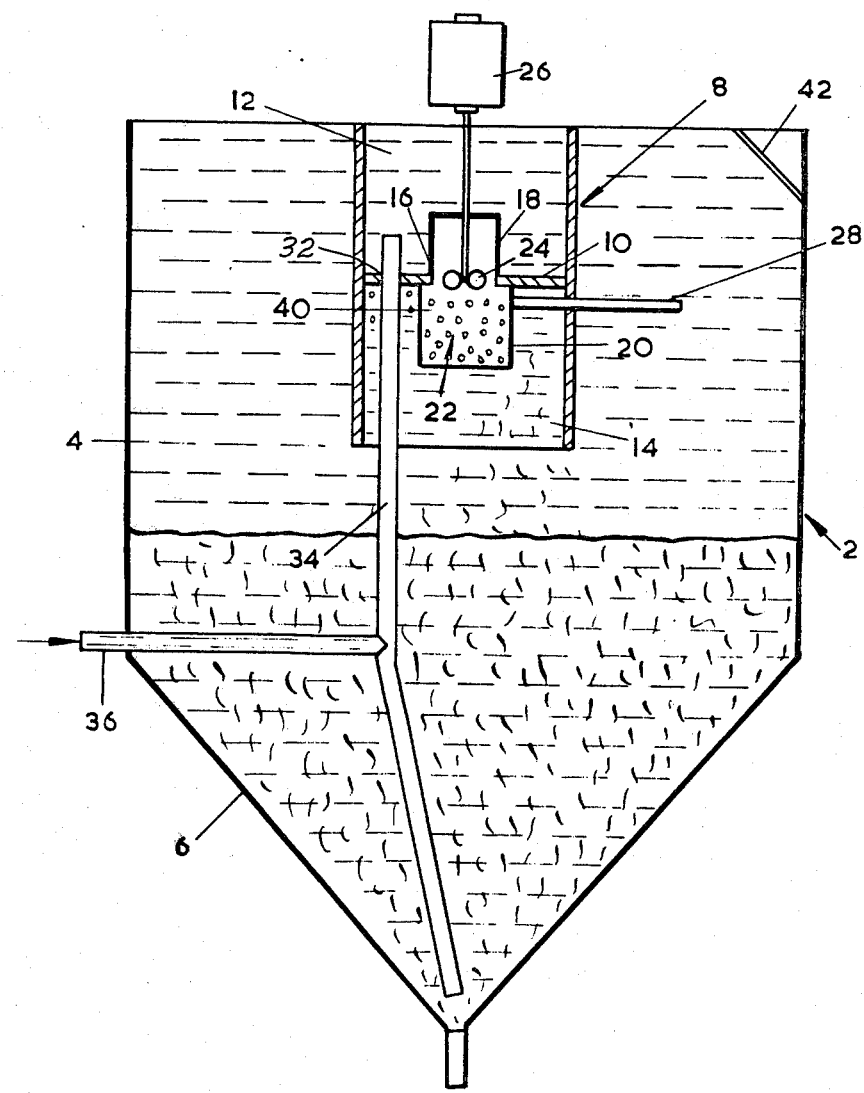
FIG. 3 is a diagrammatic representation of a third sewage treatment apparatus embodying the invention.

Referring to FIG. 3 of the drawings, a settling tank 2 has an upper cylindrical portion 4 and a lower inverted conical portion 6. Coaxial with the vertical axis of the settling tank 2 is a stilling box 8 mounted towards the top of the settling tank 2. The stilling box 8 is constituted by an open-ended tubular member. A lamina 10 situated in the stilling box 8 divides the latter into upper and lower regions indicated by the references 12 and 14 respectively. In the lamina 10 is a first aperture 16. Extending vertically upwards from the lamina 10 is a first tube 18, and extending vertically down therefrom is a second tube 20, the diameter of the second tube being greater than that of the first. Together, the tubes 18 and 20 co-operate with the aperture 16 to define a passage 22. Instead of tubes, members of other cross-sectional shape may be utilized.

The passage 22 has an inlet 28 for oxygen or oxygen-enriched air. Inlet 28 terminates in the tube 20 just below the lamina 10. A second aperture 32 is provided in the lamina 10. Mounted in this aperture is a vertical pipe 34.

The lower (inlet) end of the pipe 34 is near the bottom of the tank 2. Its upper end is situated in the upper region 12 of the stilling box 8. Another pipe 36 unites with the pipe 34 at a region near the bottom thereof. The pipe 36 passes through the wall of the tank.

In operation, the impeller 24 is rotated causing a flow of sewage from the upper region 12 to the lower region 14 of the stilling box 8. This in turn causes a suction to draw settled sludge from the bottom region of the tank 2 upwards through the pipe 34 into the upper region 12 of the stilling box 8. In addition, incoming sewage for treatment is passed into the pipe 34 from the pipe 36. Oxygen (or oxygen enriched air typically containing from 80 to 95% by volume of oxygen) is introduced into the passage 22 through the inlet 28. The impeller may draw liquid into the tube 18 forming the top of the passage 22 at a velocity of, say, 5 feet per second. The impeller 24 also causes turbulence immediately therebelow. Thus, the oxygen entering the passage 22 at the top of the tube 20 encounters turbulent liquid. The forces of shear it encounters causes the oxygen to form small bubbles. These become entrained in the liquid passing from the tube 18 of the passage 22 to be tube 20. Since the diameter of the tube 20 is wider than that of the tube 18, there will be a corresponding decrease in the velocity of the liquid passing through the passage 16. Typically, this velocity may be reduced to an average of 1 ft per second (0.3 m per second) as the liquid flows from the tube 18 to the tube 20. A further decrease in the velocity takes place as the liquid flows out of the passage 22. Typically, the velocity may be decreased to 6 feet per minute (1.9 m per minute). The precise velocities will depend on the dimensions of the passage 22 and on the speed at which the impeller 24 is rotated. The final velocity, in the order of 6 feet per minute (1.9 m per minute), should be such that relatively large bubbles will tend to rise against the flow. Thus a relatively low retention time for bubbles within the lower region of the stilling box 8 is made possible. In general, the relative velocities can be arranged such that only very small bubbles (having, say, a diameter less than 0.1 mm) are carried out of the lower region of the stilling box 8. These bubbles can then dissolve in the water outside the stilling box 8 before they have time to rise to the surface. Other bubbles will at first be retained in the lower part 14 of the stilling box 8 but will then be partially dissolved and the resultant smaller bubbles will pass out of the stilling box 8. However, further bubbles will rise upwwards towards the lamina 10. In order to prevent a large gas pocket being created in the lower region 14 of the stilling box 8, apertures 40 (of which only one is shown) are provided in the pipe 20 adjacent a region therein where there is turbulent flow so that these bubbles can be drawn back into the passage 22 and, possibly, reduced in size by the shear forces exerted in the zone of turbulence.

The sewage leaving the stilling box 8 is relatively calm and thus solids it contains may settle out towards the bottom of the tank. These solids will comprise small micro-organisms known as bacterial sludge or "activated sludge".

If desired, when starting a sewage treatment process (which will generally run continuously) a suitable stream of activated sludge may be introduced into the tank. The activated sludge requires the oxygen in order to be able to keep alive and to carry out its essential function of helping to break down offensive components of the sewage.

Thus, towards the bottom of the vessel full treatment of the sewage will take place.

The liquid at the top of the settling tank 2 outside the stilling box 8 will be relatively clear. As more sewage flows into the stilling box 8, so the level in the settling tank 2 will tend to increase. An outlet 42 may therefore be provided over which relatively clear, treated, aqueous liquor may be discharged.

In operation of the apparatus shown in FIG. 3, there may tend to be a build-up of undissolved nitrogen and carbon dioxide in the passage 22. Periodically, this can be vented by stopping or slowing down the impeller.

Figure 4:
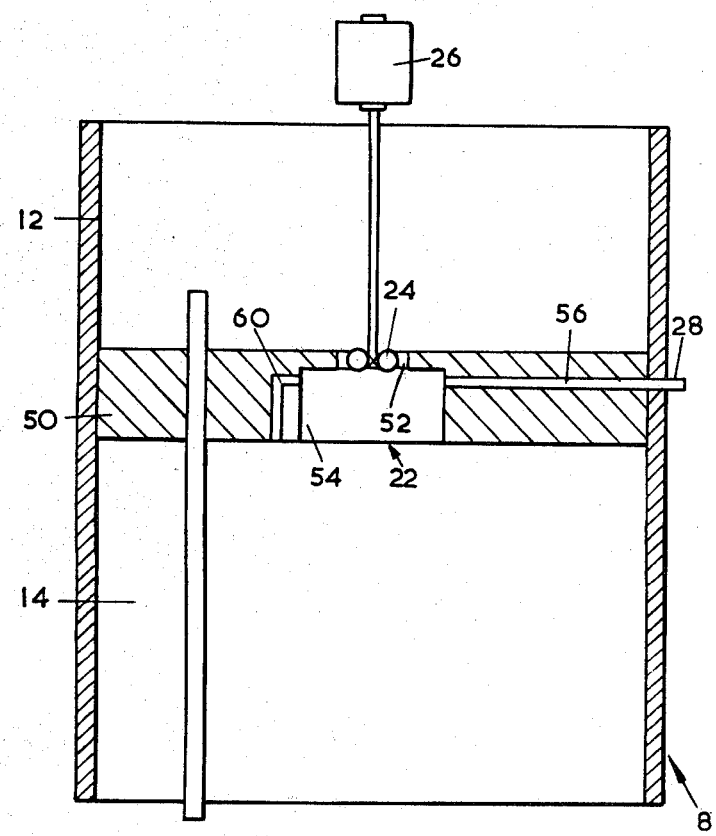
FIG. 4 is a diagrammatic representation of part of a further sewage treatment apparatus embodying the invention.

Referring now to FIG. 4, the arrangement is generally similar to that shown in FIG. 3 except that the arrangement of the passage from the upper region of the stilling box to the lower region of the stilling box is different and that a thicker partition is used to divide the stilling box into upper and lower regions.

In FIG. 4, a relatively thick plate 50 divides the stilling box 8 into an upper region 12 and a lower region 14.

The passage 22 is defined wholly by the plate 50. It has an upper part 52 of narrower cylindrical bore and a lower part 54 of wider cylindrical bore. The impeller 24 is mounted within the upper region 52 of the passage. The oxygen conduit 28 terminates in a transverse bore 56 extending through the plate 50 and affording communication with the top of the lower region 54 of the passage 22. In addition, a passage 60 is provided so as to permit re-circulation of relatively large bubbles to the turbulent zone of the passage 22.

Figure 5:
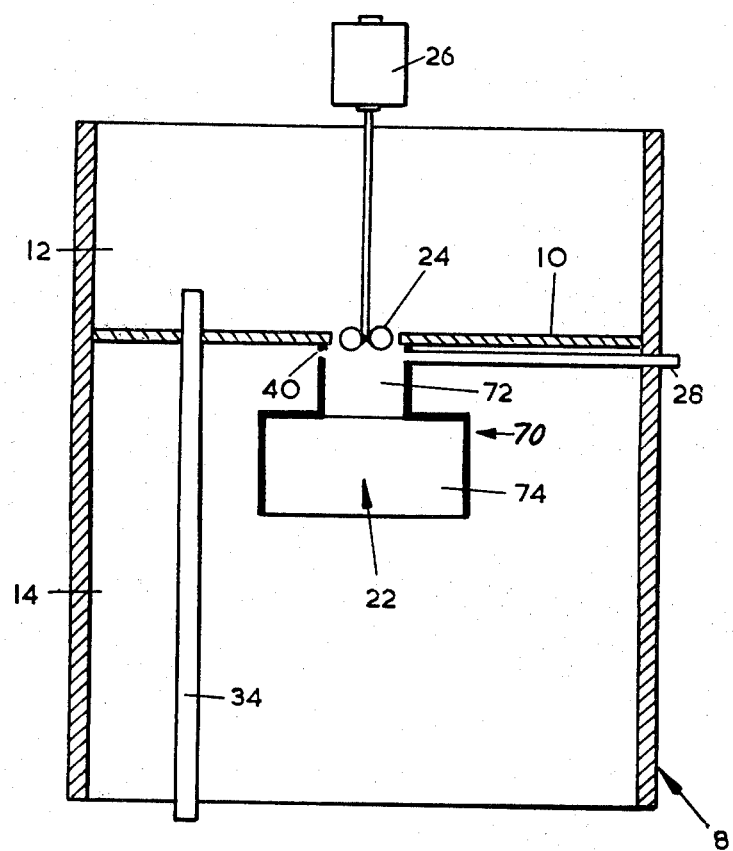
FIG. 5 is a diagrammatic representation of part of yet another sewage treatment apparatus embodying the invention.
Figure 6:
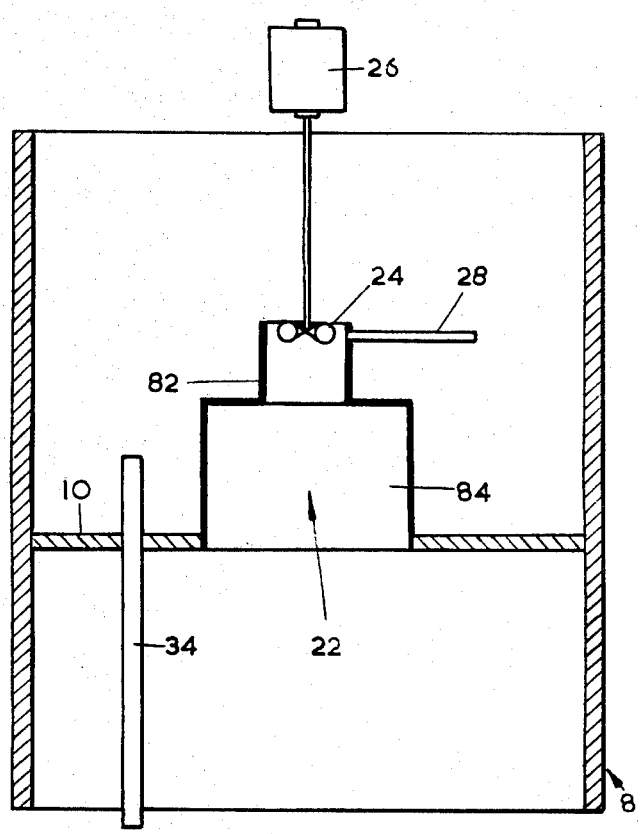
FIG. 6 is a diagrammatic representation of part of an additional sewage treatment apparatus according to the present invention.

In operation the apparatus shown in FIG. 4 functions in the same way as that shown in FIG. 3. Further alternative embodiments of the apparatus as shown in FIGS. 5 and 6. In the embodiment shown in FIG. 5 the inlet to the passage 22 is in the same plane as the lamina 10. The passage 22 is defined by a tubular member 70 having an upper narrower portion 72 and a wider lower portion 74.

In FIG. 6, the outlet of the passage 22 is in the same plane as the lamina 10. The passage is provided by an open-ended tubular member having an upper portion 82 which is of smaller diameter than a lower portion 84.

The operation of the embodiments shown in FIGS. 5 and 6 is the same as that shown in FIG. 3, except than in the embodiment shown in FIG. 6 there are no passages 40 for the return of undissolved bubbles.

The following example further illustrates the way in which the apparatus according to the invention may be utilized.

With reference to FIG. 1 of the drawings, domestic sewage having a biochemical oxygen demand of 300 ppm is introduced into the pipeline 120 at a rate of 10 cubic meters per hour (220 gallons per hour). Aqueous liquor containing suspended bacterial sludge is recycled from the region 122 through the pump 114 at a rate of 90 cubic meters per hour (1980 gallons per hour).

The oxygenating device 115 is operated with the aforementioned flow velocities therethrough and 27b of oxygen is dissolved in each cubic meter of liquid passing therethrough. The oxygenated liquid is then passed into the stilling box 112 of the tank 110. The tank 110 has at its top a diameter of 6 m and is 4 m high. It contains 43 cubic meters of flocculent bacterial sludge in the region 122 and above this sludge a layer 2 meters deep of clarified liquor. There is an upflow rate of liquid from the region 122 into the layer of clarified liquor thereabove of ½ cubic meter per hour. Clear liquor thus flows continuously over the outlet weir 128.

Typically, the liquid passing through the oxygenating device 115 contains 3000 mg/l of suspended solids and has a food to biomass ratio of 0.5.

I claim:

1. Apparatus for treating aqueous waste material having a biochemical oxygen demand, comprising a vessel for containing a volume of the material; means for continuously feeding a stream of aqueous waste material through a conduit in communication with means for defining a confined stilling zone positioned in an upper portion of the vessel; means for feeding a second stream of aqueous liquor containing bacterial sludge into said conduit to combine the streams; baffle means defining said stilling zone for keeping the combined streams separate from an upper layer of clarified liquor to be separately maintained in the upper portion of the vessel; means for withdrawing clarified liquor maintained in the upper layer of the vessel; means for combining the streams and introducing the streams into the stilling zone wherein the momentum of the liquid is substantially reduced before the liquid passes to a lower zone of the vessel wherein biological treatment of the aqueous material and collection of bacterial sludge takes place; means for introducing oxygen or oxygen-containing gas mixture into the combined streams to form discrete bubbles of oxygen gas therein and thereby facilitate dissolution of the oxygen; said means for feeding a second stream comprising means for recycling aqueous material containing bacterial sludge to the upper region of said stilling zone by withdrawing aqueous waste material containing bacterial sludge to be collected in the lower zone, said means for feeding the stream of aqueous material through the conduit and to recycle the bacterial sludge comprising pump means, an oxygen injection conduit in communication with the conduit adjacent the pump means, a partition across the stilling zone dividing it into separate upper and lower regions, said means for recycling comprising a conduit for feeding aqueous material into the upper region of the stilling zone; a passage through the partition, the passage being wider at its outlet than its inlet thereby constituting the expansion chamber, means for creating a flow, initially turbulent, of aqueous material from the upper region of the stilling zone through the passage and into the lower region of the stilling zone, and means for introducing oxygen or oxygen-containing gas mixture into the turbulent flow.

2. Apparatus according to claim 1, in which a first conduit extends from a region near the bottom of the tank and terminates in communication with the upper region of the stilling zone, and a second conduit extends from the source of aqueous waste material to be treated and terminates in communication with the upper region of the stilling zone, the means for creating a flow being capable of inducing a flow of bacterial sludge, through the first conduit and a flow of aqueous waste material to be treated through the second conduit.

* * * * *